United States Patent
Castro et al.

(10) Patent No.: US 9,909,952 B2
(45) Date of Patent: Mar. 6, 2018

(54) OPTICAL FIBERS AND METHODS ASSOCIATED THEREWITH

(71) Applicant: Panduit Corp., Tinley Park, IL (US)

(72) Inventors: Jose M. Castro, Lombard, IL (US); Richard J. Pimpinella, Frankfort, IL (US); Bulent Kose, Burr Ridge, IL (US); Brett Lane, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/142,532

(22) Filed: Apr. 29, 2016

(65) Prior Publication Data
US 2017/0315018 A1  Nov. 2, 2017

(51) Int. Cl.
H04B 10/08 (2006.01)
G01M 11/00 (2006.01)
H04B 10/079 (2013.01)
G02B 6/028 (2006.01)

(52) U.S. Cl.
CPC ........ *G01M 11/338* (2013.01); *G01M 11/332* (2013.01); *G02B 6/0288* (2013.01); *H04B 10/0795* (2013.01)

(58) Field of Classification Search
CPC .. G01M 11/338; G01M 11/332; G01M 11/30; G01M 11/088; G02B 6/0288; G02B 6/02214; G02B 6/0281; H04B 10/0795; H04B 10/2581; H04B 10/0731; H04B 10/07951; H04B 10/2507; H04B 10/073; H04B 10/079; H04B 10/0775
USPC .... 398/25, 28, 29, 141–144, 147, 20, 13, 16
See application file for complete search history.

(56) References Cited

U.S. PATENT DOCUMENTS

| | | | | |
|---|---|---|---|---|
| 7,366,421 B2* | 4/2008 | Cho | ........................ | G02B 6/14 398/142 |
| 8,351,027 B2* | 1/2013 | Pimpinella | ........... | G01M 11/338 356/73.1 |
| 8,391,661 B2* | 3/2013 | Molin | .................. | G02B 6/0288 385/124 |
| 8,488,115 B2* | 7/2013 | Pimpinella | ........... | G01M 11/338 356/73.1 |
| 8,531,654 B2* | 9/2013 | Tudury | ................ | G01M 11/335 356/73.1 |

(Continued)

FOREIGN PATENT DOCUMENTS

| | | |
|---|---|---|
| WO | 2012054172 A1 | 4/2012 |
| WO | 2016022884 A1 | 2/2016 |
| WO | 2016034913 A1 | 3/2016 |

OTHER PUBLICATIONS

Modal and Chromatic Dispersions Interference in VCSEL and MMF based Gigabit Ethernet Link. Asghar Gholami, Denis Molin, Pierre Sillard. © 2009 OSA/OFC/NFOEC 2009.*

(Continued)

*Primary Examiner* — Hibret Woldekidan
(74) *Attorney, Agent, or Firm* — Christopher S. Clancy; James H. Williams; Christopher K. Marlow

(57) ABSTRACT

Embodiments of the present invention generally relate to the field of fiber optics, and more specifically to apparatuses, methods, and/or systems associated with testing fiber optic transmitters. In an embodiment, the present invention is an apparatus comprising a laser optimized multimode fiber having near minimally compliant effective modal bandwidth, near maximum channel length, and α-profile that produces an R-MMF DMD slope.

10 Claims, 9 Drawing Sheets

(56) References Cited

U.S. PATENT DOCUMENTS

| | | | | |
|---|---|---|---|---|
| 8,630,545 | B2* | 1/2014 | Gholami | H04B 10/2581 |
| | | | | 398/143 |
| 8,891,074 | B2* | 11/2014 | Molin | G01M 11/088 |
| | | | | 356/73.1 |
| 8,922,763 | B2* | 12/2014 | Tudury | G01M 11/335 |
| | | | | 356/73.1 |
| 8,958,675 | B2* | 2/2015 | Bickham | G02B 6/02261 |
| | | | | 385/123 |
| 9,329,335 | B2* | 5/2016 | Balemarthy | G02B 6/0288 |
| 9,377,579 | B2* | 6/2016 | Molin | G02B 6/0288 |
| 9,411,096 | B2* | 8/2016 | Pimpinella | G02B 6/0288 |
| 9,632,244 | B2* | 4/2017 | Castro | G02B 6/0288 |
| 2003/0113118 | A1* | 6/2003 | Bartur | H04B 10/0771 |
| | | | | 398/139 |
| 2005/0013570 | A1* | 1/2005 | Guan | G02B 6/0288 |
| | | | | 385/124 |
| 2010/0028020 | A1* | 2/2010 | Gholami | G01M 11/338 |
| | | | | 398/159 |
| 2011/0037183 | A1* | 2/2011 | Tudury | G02B 6/0288 |
| | | | | 264/1.28 |
| 2011/0293290 | A1* | 12/2011 | Gholami | G01M 11/338 |
| | | | | 398/192 |
| 2012/0195561 | A1* | 8/2012 | Molin | G02B 6/0288 |
| | | | | 385/124 |
| 2017/0199326 | A1* | 7/2017 | Castro | G02B 6/02257 |

OTHER PUBLICATIONS

"50Gbit/s PAM-4 MMF Transmission Using 1060nm VCSELs with Reach Beyond 200m", OFC 2014, OSA, Pavan Sriharsha Koto, et al., 3 pages, Mar. 19, 2014.

* cited by examiner

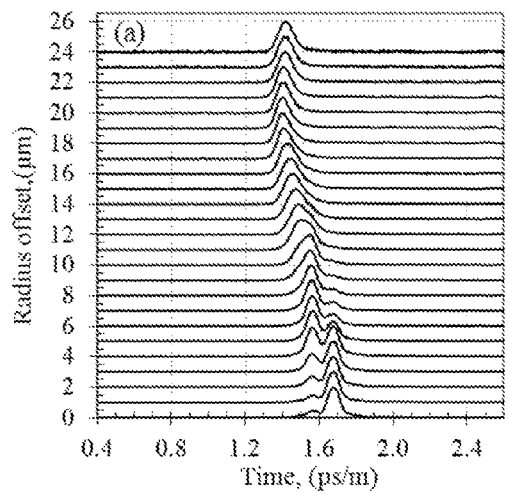 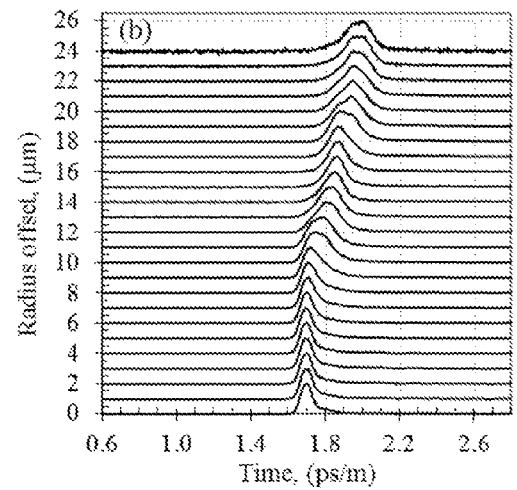
Fig. 4A          Fig. 4B
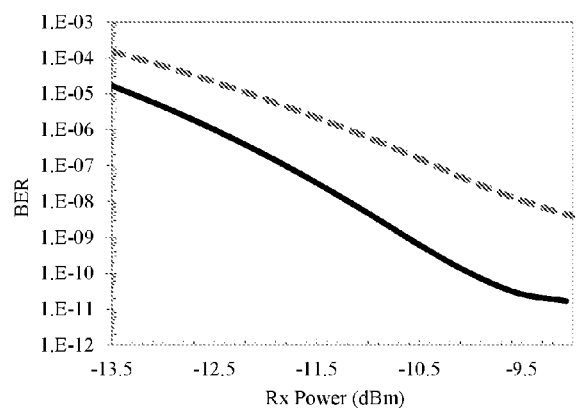
Fig. 5

OPTICAL FIBERS AND METHODS ASSOCIATED THEREWITH

FIELD OF INVENTION

Embodiments of the present invention generally relate to the field of fiber optics, and more specifically to apparatuses, methods, and/or systems associated with testing fiber optic transmitters.

BACKGROUND

A fiber optic transmission channel is typically made up of a transmitter, a receiver, and an optical waveguide linking these two components. In short-haul applications, a common waveguide is a laser-optimized multimode optical fiber that is rated to some standard like, for example, the OM3 or OM4 standards specified in ISO/IEC 11801 and ANSI/TIA-568-C.3. OM3 rated fibers have a minimum effective modal bandwidth of 2000 MHz·km and OM4 rated fibers have a minimum effective modal bandwidth of 4700 MHz·km. These fibers are often paired with VCSEL-based transmitters and receivers (commonly referred to herein as "transceivers") with emission wavelengths usually around 850 nm±10 nm.

To help ensure the performance of these channels, standard organizations like IEEE 802.3 and INCITS T11 specify the worst-case operational parameters for the transceivers and fiber channel links. However, using worst-case multimode fibers (MMFs) to evaluate transceivers, especially in a high volume manufacturing environment, presents significant challenges. Generally speaking, for a given alpha-refractive index profile, a wide range of effective modal bandwidth (EMB) and differential mode delay (DMD) values are produced within a drawn length of fiber due to manufacturing process variations during the fiber preform vapor deposition. Typically, bare MMF is spooled in lengths of 8.8 km or 17.6 km for the cabling operation, and bare fiber test samples are cut from both ends of the spooled bare fiber. In this case, test samples range in length from 300 m to 1000 m. An alternative method is to measure the EMB and/or DMD over the total length of the spooled fiber, where the EMB represents the average value. Based on these measurements, the fiber spools are classified as OM3, OM4 or Wideband MMF. However, both test methods have deficiencies. Due to bandwidth variation along the spooled bare fiber, testing short end pieces or the average over the total length does not guarantee the bandwidth at any given segment along the fiber. Depending on the manufacturing process variation, the actual value of a short fiber segment (<1000 m) along the spooled fiber can vary significantly. Experiments, using a state of the art DMD/EMB measurement system indicates the EMB and DMD can vary from 5% to 30%. As such, due to the manufacturing variability and low yield for fibers having a bandwidth within the critical region for the worst-case scenario, obtaining a fiber with the particular characteristics can be problematic.

While such problem may be dealt with by an extensive and costly evaluation of numerous fibers, a more critical problem is caused by an incomplete description of the fiber dispersion phenomena in the link modes utilized in the estimation of the worst-case channels. The link models utilized in industry standards assume that the modal and chromatic dispersion do not interact and therefore the sign of the MMF differential mode delay (DMD) does not have an effect on the performance of the channel. This assumption, however, is incorrect, and the interaction between the modal and chromatic dispersion can significantly affect the overall performance of the fiber. As a result, a fiber that may be considered to be a worst-case scenario fiber may, after all, perform considerably better than expected. This can lead to inaccurate test results for transceivers, and thus there is a need for improved methods, systems, and apparatuses designed to enable more accurate optical transceiver testing.

SUMMARY

Accordingly, at least some embodiments of the present invention are directed towards methods, systems, and apparatuses designed to enable more accurate optical transceiver testing.

In an embodiment, the present invention is a method of manufacturing a graded-index multimode optical fiber having at least one dopant, where the graded-index multimode optical fiber comprises: a core, the core having a center, a radius R, and a refractive index profile; and a cladding surrounding the core. The method of this embodiment comprises the steps of (1) selecting the at least one dopant; (2) introducing the at least one dopant into the core; and (3) controlling the concentration of the at least one dopant during the introduction to produce the refractive index profile, the at least one dopant being selected and the concentration of the at least one dopant being controlled such that the refractive index profile causes the graded-index multimode optical fiber to exacerbate modal chromatic dispersion interaction when coupled with an optical transmitter, the at least one dopant being further selected and the concentration of the at least one dopant being further controlled such that an effective modal bandwidth (EMB) of the graded-index multimode optical fiber is equal to a minimum modal bandwidth requirement specified by a defined standard +/−10%.

In another embodiment, the present invention is a method for selecting a test optical fiber for use in testing one or more optical transmitter. The method comprises the steps of: (1) for the test optical fiber determining: a desired effective modal bandwidth ($EMB_D$); a percentage of allowable variation of the $EMB_D$ (A); a desired length ($L_D$); a percentage of allowable variation of the $L_D$ (B); a tolerance variable (X); and a desired total bandwidth BW, where $$BW = \frac{EMB_D}{L_D};$$

(2) selecting a candidate optical fiber; (3) obtaining an effective modal bandwidth of the candidate optical fiber ($EMB_{sp}$); (4) rejecting the candidate optical fiber when $EMB_{sp} \geq EMB_D$ (1+A+B) is true or when $EMB_{sp} \leq EMB_D$ (1−A−B−X) is true; (5) cutting the candidate optical fiber to a first length $L_1$, where $L_1 = L_D$ (1+B), when $EMB_{sp} \geq EMB_D$ (1+A+B) is false and when $EMB_{sp} \leq EMB_D$ (1−A−B−X) is false; (6) measuring an effective modal bandwidth of the candidate optical fiber cut to the first length $L_1$ ($EMB_{m1}$); (7) accepting the candidate optical fiber cut to the first length $L_1$ as the test optical fiber when $$BW(1-A) \leq \frac{EMB_{m1}}{L_1} \leq BW(1+A)$$

is true; (8) performing additional evaluation steps when $$BW(1-A) \le \frac{EMB_{m1}}{L_1} \le BW(1+A)$$

is false, the additional evaluation steps including: (a) rejecting the candidate optical fiber cut to the first length L when $$\frac{EMB_{m1}}{L_D(1+B)} \le BW(1-A)$$

is false or when $$\frac{EMB_{m1}}{L_D(1-B)} \ge BW(1-A)$$

is false; (b) cutting the candidate optical fiber cut to the first length $L_1$ down to a second length $L_2$, where $L_2$=max(($EMB_{m1}$/BW),$L_D$(1-B)) when $$\frac{EMB_{m1}}{L_D(1+B)} \le BW(1-A)$$

is true and when $$\frac{EMB_{m1}}{L_D(1-B)} \ge BW(1-A)$$

is true; (c) measuring an effective modal bandwidth of the candidate optical fiber cut to the second length $L_2$ ($EMB_{m2}$); (d) rejecting the candidate optical fiber cut to the second length $L_2$ when $$BW(1-A) \le \frac{EMB_{m2}}{L_2} \le BW(1+A)$$

is false; and (e) accepting the candidate optical fiber cut to the second length $L_2$ as the test optical fiber when $$BW(1-A) \le \frac{EMB_{m2}}{L_2} \le BW(1+A)$$

is true.

In yet another embodiment, the present invention is a method for selecting a test optical fiber for use in testing one or more optical transmitter. The method comprises the steps of: (1) for the test optical fiber determining: a desired effective modal bandwidth ($EMB_D$); a percentage of allowable variation of the $EMB_D$ (A); a desired length ($L_D$); a percentage of allowable variation of the $L_D$ (B); a tolerance variable (X); and a desired total bandwidth BW, where $$BW = \frac{EMB_D}{L_D};$$

(2) selecting a candidate optical fiber; (3) obtaining an effective modal bandwidth of the candidate optical fiber ($EMB_{sp}$); (4) rejecting the candidate optical fiber when $EMB_{sp} \ge EMB_D$ (1+A+B) is true or when $EMB_{sp} \le EMB_D$ (1-A-B-X) is true; (5) cutting the candidate optical fiber to a first length $L_1$, where $L_1=L_D$ (1+B), when $EMB_{sp} \ge EMB_D$ (1+A+B) is false and when $EMB_{sp} \le EMB_D$ (1-A-B-X) is false; (6) measuring an effective modal bandwidth of the candidate optical fiber cut to the first length $L_1$ ($EMB_{m1}$); (7) accepting the candidate optical fiber cut to the first length $L_1$ as the test optical fiber when $$BW(1-A) \le \frac{EMB_{m1}}{L_1} \le BW(1+A)$$

is true; and (8) rejecting the candidate optical fiber cut to the first length $L_1$ as the test optical fiber when $$BW(1-A) \le \frac{EMB_{m1}}{L_1} \le BW(1+A)$$

is false.

In still yet another embodiment, the present invention is an apparatus for testing an optical transmitter, the optical transmitter designed to be used with an optical fiber meeting a minimum modal bandwidth requirement specified by a defined standard. The apparatus comprises an enclosure; a test optical fiber positioned at least partially within the enclosure; and a first connector installed on a first end of the test optical fiber and a second connector installed on a second end of the test optical fiber, one of the first connector or the second connector configured to be connected to the optical transmitter, wherein, when coupled with the optical transmitter, the test optical fiber exacerbates modal chromatic dispersion interaction and has an effective modal bandwidth (EMB) that is equal to the minimum modal bandwidth +/−10%.

In still yet another embodiment, the present invention is a method for testing an optical transceiver designed to be used with an optical fiber meeting a minimum modal bandwidth requirement specified by a defined standard. The method comprises the steps of: (1) connecting a first end of a test optical fiber to the optical transceiver, the test optical fiber being configured to exacerbate modal chromatic dispersion interaction and having an effective modal bandwidth (EMB) that is equal to the minimum modal bandwidth +/−10%; (2) connecting a second end of the test optical fiber to a reference test receiver; (3) transmitting an optical signal from the optical transmitter to the reference test receiver via the test optical fiber; and (4) evaluating the received optical signal.

In a variation of these embodiments, the subject fiber has a right-shifted differential mode delay (DMD) plot.

In a further variation of these embodiments, the DMD plot is measured by launching a plurality of spectrally narrow and temporally short pulses of light radiation into one end of the subject fiber at various radial distances r from the center of the core, and recording a temporal response for each of the spectrally narrow and temporally short pulses of light radiation at the respective radial distances r from the center of the core at a second end of the subject fiber, and the right-shifted differential mode delay (DMD) plot is characterized by a positive slope of a linear fit calculated between a first radial offset $r_{init}$ and a second radial offset $r_{end}$, the second radial offset r being greater than the first radial offset $r_{init}$.

In still a further variation of these embodiments, the linear fit is calculated by computing a centroid T(r) for at least each of the spectrally narrow and temporally short pulses of light radiation between the first radial offset $r_{init}$ and the second radial offset $r_{end}$, and using each respective the centroid T(r) to compute the linear fit between the first radial offset $r_{init}$ and the second radial offset $r_{end}$ via least square estimation.

In yet still another variation of these embodiments, the first radial offset $r_{init}$ is one of 1 μm, 4 μm, or 5 μm, and wherein the second radial offset $r_{end}$ is one of 19 μm, 20 μm, or 23 μm.

These and other features, aspects, and advantages of the present invention will become better-understood with reference to the following drawings, description, and any claims that may follow.

BRIEF DESCRIPTION OF THE DRAWINGS

FIG. 4A illustrates a DMD plot for an exemplary L-MMF.

FIG. 4B illustrates a DMD plot for an exemplary R-MMF.

FIG. 5 illustrates the measured BER performance of fibers represented in FIGS. 4A and 4B.

DETAILED DESCRIPTION

Figure 1:
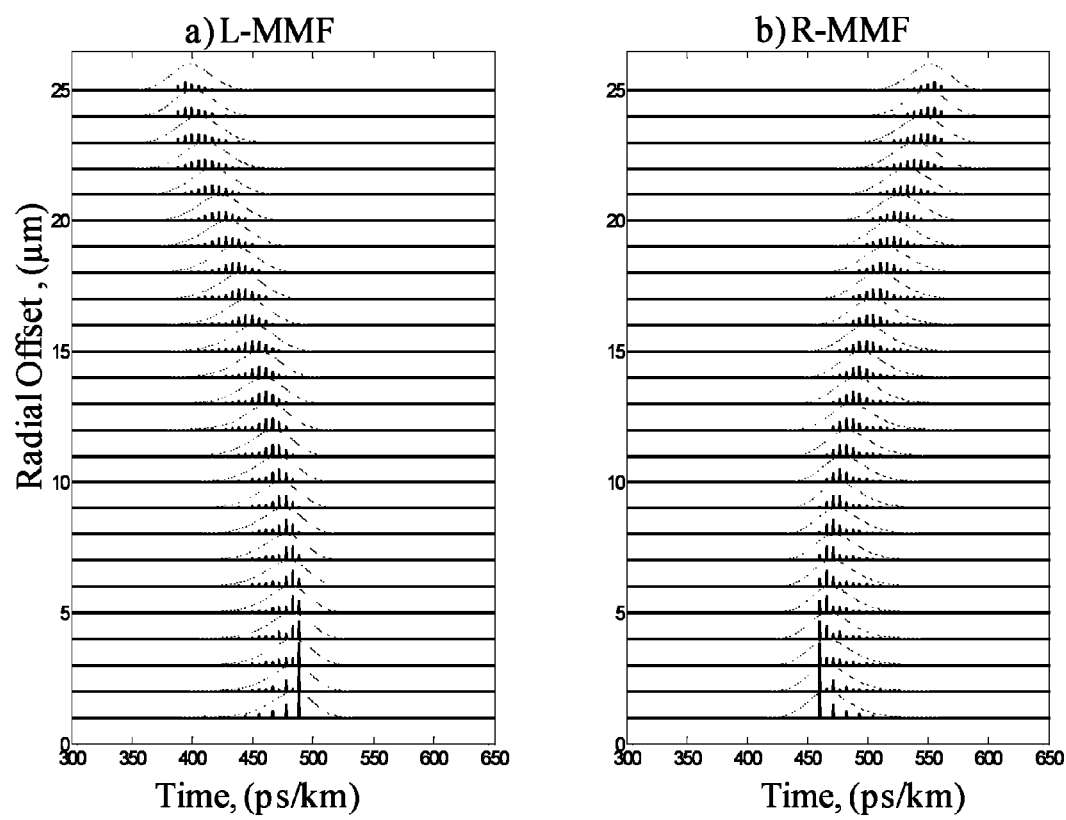
FIG. 1 illustrates DMD radial waveform plots for two fibers with equal radial mode group delays but opposite sign.

A refractive index of a core of a graded MMF is typically defined by a parabolic formula described by an α-parameter. Such profile is often referred to as the α-profile and is described by a function given by, $$n = n_1 \sqrt{1 - 2\Delta \left(\frac{r}{R}\right)^\alpha} \quad (1)$$

where $\Delta=(n_1-n_2)/n_1$, $n_1$ is the refractive index on the axis of the fiber, $n_2$ is the refractive index in the cladding, r is the radial position inside the fiber core, R is the core radius, and α is the exponent parameter which takes a value of ~2 for fibers designed to support operation near 850 nm.

From theory described in R. Pimpinella, J. Castro, B. Kose, and B. Land, "Dispersion Compensated Multimode Fiber," Proceedings of the 60 IWCS 2011, which is incorporated herein by reference in its entirety, a simplified expression for the relative mode group delay, $t_g$, can be derived from equation (1) as a function of the wavelength and the α-profile parameters as shown, $$t_g(\lambda) = \frac{N_1(\lambda)}{c}\left[\Delta\left(\frac{\alpha - \alpha_{opt}(\lambda)}{\alpha + 2}\right) \cdot \left(\frac{v_g}{v_T}\right)^{\alpha/(\alpha+2)} + \ldots\right] \quad (2)$$

where c is the speed of light in the vacuum, g is the mode group (MG) index, (a mode group comprises those modes that have nearly equal propagation constants), $v_g$ is the number of modes inside the MG which have a propagation constant larger than $\beta_g(v)$, $v_T$ is the total number of modes, N, is the group refractive index of the core material at r=0 and, and λ is the optical source wavelength.

The optimum alpha value that minimizes group delay at a single operational wavelength λ and y the profile dispersion parameter are given by, $$\alpha_{opt}(\lambda) = 2 + y(\lambda) - \Delta\frac{(4 + y(\lambda))(3 + y(\lambda))}{5 + 2y(\lambda)} \quad (3)$$

where, $$y(\lambda) = -\frac{2n_1}{N_1}\frac{\lambda}{\Delta}\frac{d\Delta}{d\lambda} \quad (4)$$

The modal bandwidth of a laser-optimized MMF is characterized by measuring its DMD or EMB; metrics standardized within domestic and international standards organizations like TIA-455-220-A and/or IEC 60793-1-49, both of which are incorporated herein by reference in their entirety. The DMD test method describes a procedure for launching a temporally short and spectrally narrow pulse (reference pulse) from a SMF (single mode fiber) into the core of a MMF at several radial offsets. After propagating through the MMF under test, the pulses are received by a fast photodetector which captures all the MMF core power. The DMD is computed as the relative difference in mode group delay in the received signal as described in the standards. The EMB is estimated by the Fourier domain deconvolution of the input pulse from a weighted sum of the received signals for each radial offset launch. The set of weight values utilized in the computation belong to a set of ten representative VCSELs described in TIA-455-220-A.

The relation between modal bandwidth, total bandwidth, and the fiber design parameters can be obtained from equation (2). In this equation, the magnitude of the term $(\alpha-\alpha_{opt})$ is proportional to the mode group delays and therefore inversely related with modal bandwidth. On the other hand, the sign of $(\alpha-\alpha_{opt})$ determines the tilt or slope of the group delays with increasing radial offsets which is important for the computation of the modal-chromatic dispersion interaction (MCDI) and total bandwidth when a fiber is utilized with VCSEL based transceivers as described below.

To illustrate this concept and the physical meaning of the DMD slope and sign, two simulated α-profile MMFs are shown in FIG. 1. In this figure the horizontal axis is the relative time delays (ps/m) of the excited radial mode groups measured at the detector. The vertical axis represents the mode group pulse waveform amplitude for each radial offset of the SMF launch fiber. The lines inside each DMD pulse represent the discrete mode groups of the fibers, which are identical in both DMD plots (a) and (b). For each DMD plot one can compute a least square error (LSE) line connecting the pulses' centroids. The sign of the connecting line slope can be utilized to classify the fibers as left-shifted (L-MMF) i.e., negative slope, or right-shifted (R-MMF) positive slope. Since the magnitudes of the slopes of the radial pulse centroids for these two simulated fibers are identical, the DMD and calculated modal bandwidth are the same.

For L-MMF (negative DMD slope) higher order modes travel faster than lower order modes as can be observed from their shorter arrival time to the detector, herein referred to as negative relative group delay. Conversely, for R-MMF (positive DMD slope) higher order modes travel slower than lower order modes.

In VCSEL-MMF channels, the estimation of the total channel bandwidth depends on the interaction of the spectral dependent coupling of the VCSEL modes to fiber modes. This coupling produces a mode spectral bias (MSB), where shorter VCSEL wavelengths tend to couple into higher-order fiber modes and longer VCSEL wavelengths tend to couple into lower-order fiber modes. Consequently, the difference in mode group delays is a result of both modal and chromatic dispersion effects. The effect of MSB on group velocity is summarized in Table I below:

TABLE I

MCDI: Effect of MSB in MMF mode speed.

| MMF Modes | MMF Mode Spectra | Spectra Effect on Group Velocity |
|---|---|---|
| Higher order modes | Transport energy of lower regions of the VCSEL spectrum (Shorter wavelengths) | Reduced velocity |
| Lower order modes | Transport energy of higher regions of the VCSEL spectrum (Longer wavelengths) | Increased velocity |

In general, MSB leads to MCDI which, depending on the α-profile, can either increase or decrease the total channel bandwidth and have a positive or negative impact on mode partition noise (MPN).

In order to utilize MCDI to increase the channel bandwidth the group velocities of the higher-order modes (HOMs) must propagate faster than the low-order modes (LOMs) when measured at the operational wavelength of the VCSEL based transceiver. This condition produces a DMD profile and slope sign similar to the one shown in FIG. 1 for the L-MMFs. Since HOMs carry the shorter wavelengths of the VCSEL spectrum, one can compensate for their reduced speed caused by chromatic dispersion effects. The opposite occurs with LOMs, which carry the VCSEL spectrum biased toward longer wavelengths. Therefore, the resultant speeds of the modes tend to equalize as they propagate in the MMF. This modal-chromatic dispersion interaction is summarized in Table II below:

TABLE II

Effect of mode spectral bias and DMD slope sign on channel bandwidth.

| Fiber | Without MSB | With MSB |
|---|---|---|
| L-MMF | HOM propagate faster than LOM | Reduced mode group velocity differences between HOMs and LOMs. Improved bandwidth |
| R-MMF | LOM propagate faster than HOM | Increased mode group velocity differences between HOMs and LOMs. Reduced bandwidth |

By intentionally compensating modal and chromatic dispersion, benefits in channel reach and bit error rate (BER) performance are realized in L-MMF compared to R-MMF.

Figure 2A:
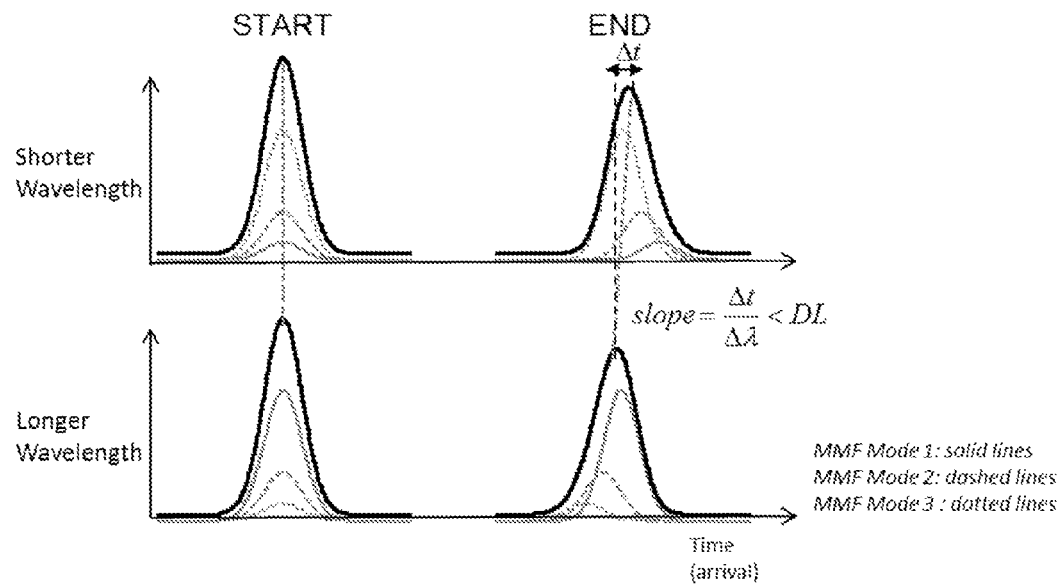
FIG. 2(A) illustrates a simulated effect of modal chromatic dispersion compensation and MPN reduction using L-MMF.
Figure 2B:
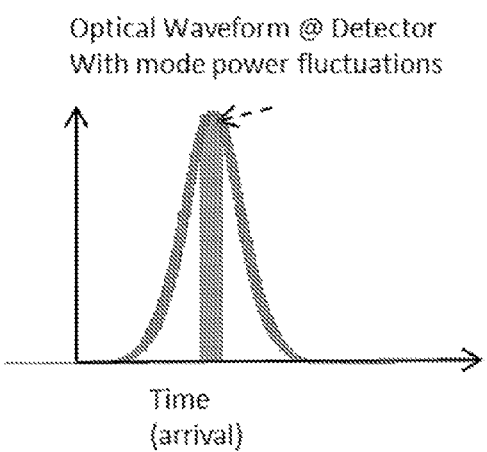
FIG. 2(B) illustrates MPN effects after propagation in the MMF of FIG. 2(A).
Figure 3A:
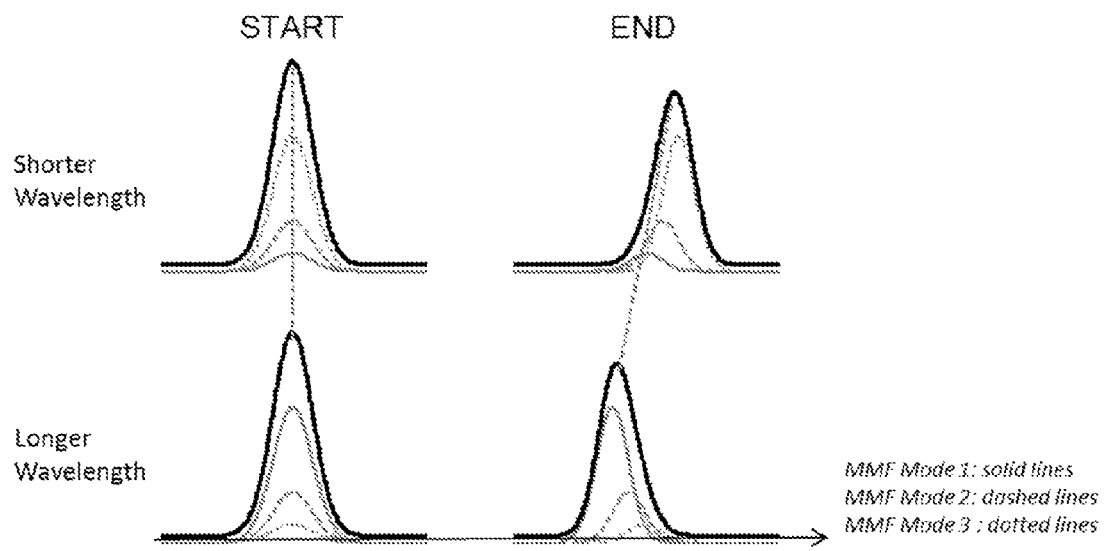
FIG. 3(A) illustrates a simulated effect of modal chromatic dispersion compensation and MPN reduction using R-MMF.

In MMF channels using VCSEL-based transceiver, R-MMF not only increases dispersion as expressed in the inter-symbol interference (ISI) penalty, but also the MPN. FIGS. 2A-3B show an example to illustrate the effect of MCDI. For sake of simplicity, an MMF with only 3 modes and a VCSEL with 2 modes is described. More advanced modeling may be found in J. Castro, R Pimpinella, B. Kose, and B. Lane, "Investigation of the Interaction of Modal and Chromatic Dispersion in VCSEL-MMF Channels," IEEE OSA JLT, 30(15), pp. 2532-2541, which is incorporated herein by reference in its entirety. FIG. 2A illustrate MCDI for L-MMF and FIG. 3A illustrate MCDI for R-MMF. In these figures, the label "START" is used to indicate the shape of the pulse coupled from the VCSEL to the input end of the MMF. There is no pulse propagation at this point. The "END" label indicates the pulses that reach the receiver after propagating along the L-MMF and R-MMF. In this example, the VCSEL modes are labeled as longer wavelength and shorter wavelength mode.

Figure 3B:
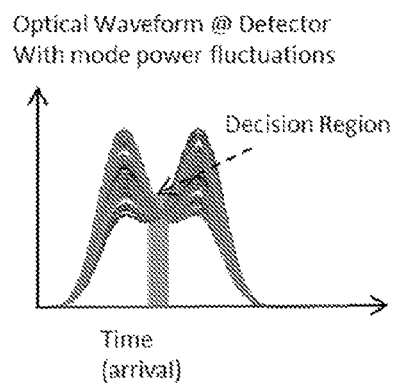
FIG. 3(B) illustrates MPN effects after propagation in the MMF of FIG. 3(A).

In both FIGS. 2A and 3A, the thick solid lines indicate the total pulse signal, which is composed by the sum of the signals of the three modes excited in the respective fiber. The lower order VCSEL modes (longer wavelength) couple more efficiently to the lower order fiber modes. In L-MMF the LOMs travel at slower speed. In contrast, HOM VCSEL modes (shorter wavelength) couple more efficiently to the higher order modes in the MMF. The HOMs of the L-MMF propagate slower. As a consequence of this spectral dependent coupling, dissimilar chromatic effects occurs for the LOMs and HOMs. Since the wavelength of the LOM is longer, the velocity of this mode increase. The opposite occurs with the HOM which tend to reduce the velocity since shorter wavelength propagate slower in optical fiber. As a result of this opposite effects in the fiber modes, the pulse dispersion is minimized. The reduced dispersion improves ISI and MPN. The MPN penalty is reduced since the fluctuation of the VCSEL power between the shorter and longer wavelength have little effect on the shape of the pulse at the receiver as it can be seen in FIG. 2B. FIGS. 3A and 3B show the opposite case where a R-MMF exacerbates dispersion and MPN. For a R-MMF the pulses separate more since LOM/HOM, which were the faster/slower pulses, propagate even faster/slower, respectively. This increases the ISI penalty. The power fluctuation among VCSEL modes significantly affects the signal reaching the receiver as shown in FIG. 3B.

Modeling and measurements show that for a given MMF of similar EMB, R-MMF represents the worst-case MMF channel while the L-MMF may perform better than expected, as determined by the fiber's resulting BER. This can be illustrated with reference to two fibers having right and left shifted DMDs, as shown in FIGS. 4A and 4B. The fibers of both FIGS. 4A and 4B exhibit a similar EMB of approximately 4550 MHz-km, but opposite DMD slope signs; the fiber of FIG. 4A is a L-MMF and the fiber of FIG.

4B is a R-MMF. FIG. 5 shows the BER measurement results for the two fibers of FIGS. 4A (solid line) and 4B (dashed line) where the same 10G VCSEL transceiver with a 0.45 nm spectral width is coupled to the R-MMF and L-MMF (both having a length of 550 m). The observed differences in BER is significant, more than 3 orders in magnitude where, at 10e-9 the R-MMF shows an additional penalty of about 2 dB. Typically, additional penalties in the power budget of 0.5 to 2 dB have been observed in R-MMF as compared to L-MMF.

Recognizing this phenomenon enables a more comprehensive testing solution as a more finely tuned near worst-case scenario channel fiber may be implemented in the testing procedures. This may reduce instances where a non-compliant transceiver will pass standardization as a result of being tested with a better-performing L-MMF.

Figure 6:
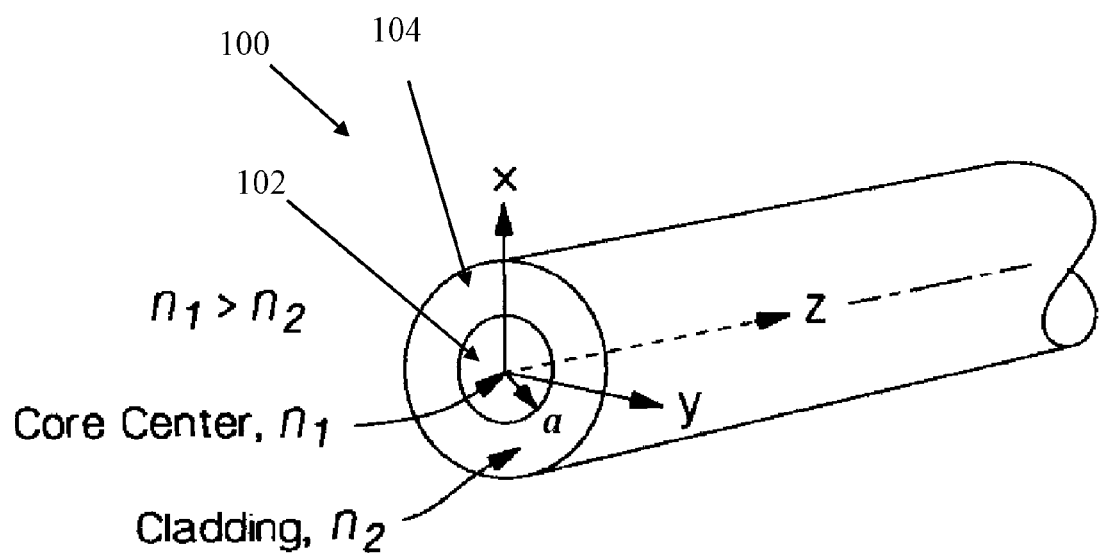
FIG. 6 illustrates an isometric cross-section view of an optical fiber according to an embodiment of the present invention.

Accordingly, FIG. 6 illustrates an isometric cross section view of an exemplary fiber 100 in accordance with the present invention. As shown therein, fiber 100 includes a core 102 having a radius R, a cladding 104 surrounding the core 102, and a jacket (not shown) surrounding the cladding 104. The core has a graded refractive index profile whereby it follows the following formula:

$$n(r) = n_1 * \sqrt{1 - 2\left(\frac{r}{R}\right)^\alpha \Delta_0}, \text{ for } r < R,$$

where r is a radial distance from a center of the core 102, $n_1$ is a refractive index at the center of the core 102, $n_2$ is a refractive index of the cladding 104, $\alpha$ is a parameter defining a shape of the refractive index profile, and $$\Delta_0 = \frac{n_1^2 - n_2^2}{2n_1^2}.$$

Figure 7:
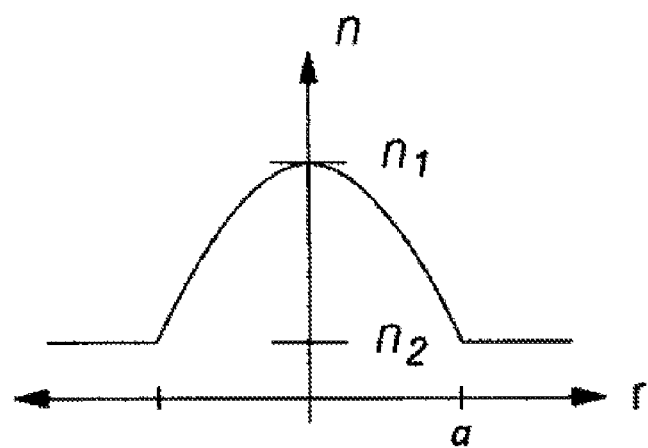
FIG. 7 illustrates a refractive index profile of an optical fiber according to an embodiment of the present invention.

FIG. 7 illustrates an exemplary shape of a refractive index profile of a core and cladding according to an embodiment of the present invention. Such profile can be obtained by introducing dopant(s) into the core and controlling the concentration of the dopant(s) to achieve the desired result.

To allow the fiber to be used in transceiver testing, in an embodiment the fiber is selected to have an EMB of 2000±100 MHz·km and a length L=300 m±5% where $\alpha>\alpha_{opt}$ ($\lambda$=850 nm). It is important that the fiber exhibit a R-MMF condition with a positive DMD slope. This is evidence of exacerbation of modal chromatic dispersion interaction.

Additionally, the fiber could have a DMD outer mask greater than 150 ps/km. As used herein, the term "outer mask" is defined as a range of radial positions ranging from the center of the core to approximately 23 µm.

In another embodiment, the fiber may be selected to have an EMB=4700±100 MHz·km with a negative DMD slope at 850 nm and an EMB=2500±100 MHz·km with a positive DMD slope at 950 nm, where L=100±5%. In this case, $\alpha<\alpha_{opt}$ ($\lambda$=850 nm) and $\alpha>\alpha_{opt}$ ($\Delta$>900 nm).

In an embodiment, the tilt and/or sign of the DMD slope may be determined in the following way. First, there is a computation of the centroid T(r) of each of the DMD pulses at each radial offset using the formula:

$$T(r) = \frac{\sum_{t=t_{min}}^{t_{max}} tP(r, t)}{\sum_{t=t_{min}}^{t_{max}} P(r, t)}$$

where P(r,t) is the value of the pulse shape (e.g., amplitude, normalized amplitude, or any other variable that may be used to represent the value of the shape of the pulse) as a function of time t at the radial offset r. The pulse shape is obtained from the DMD measurement of the fiber. Next, there is a computation of a slope linear fit of the centroids between the $r_{init}$ and $r_{end}$ radial offsets. In an embodiment, a least square estimation, as shown below, is used for this computation:

$$\text{Slope} = \frac{\sum_{r=r_{init}}^{r_{end}} [r - \text{mean}(r)][T(r) - \text{mean}(T(r))]}{\sum_{r=r_{init}}^{r_{end}} [r - \text{mean}(r)]^2}$$

Figure 8:
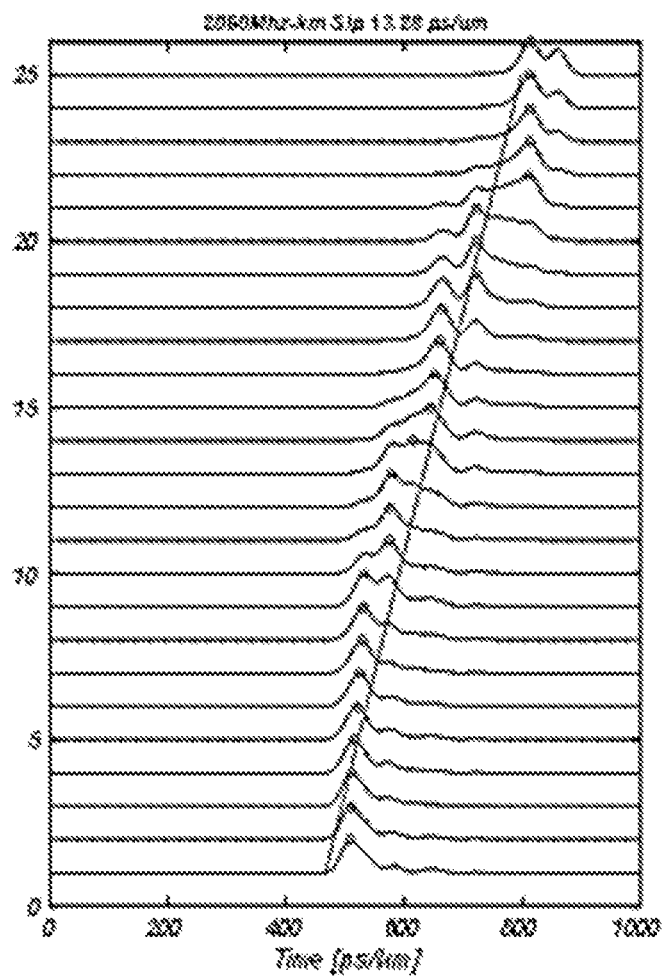
FIG. 8 illustrates an exemplary DMD plot and corresponding slope calculations.

An exemplary calculation of the slope is provided with reference to FIG. 8. Shown therein is a DMD profile of a fiber selected to have an EMB of 2000±100 MHz·km. Using a temporal range $[t_{min}, t_{max}]$=[200,1000] ps, the calculated centroids at each radial offset is shown as a dot on each respective pulse. Next, using radial offsets $r_{init}$=4µ and $r_{end}$=20µ, the slope is computed using the equation above and a linear estimation based on this slope is shown as the straight line traversing the pulses diagonally. The calculated slope sign was positive with a magnitude of 14 ps/m. Note that the 4 µm and 20 µm radial offsets are merely exemplary and other values (e.g., 5 µm and 19 µm; 0 µm and 23 µm; etc.) may be selected as deemed necessary.

In order to produce a near minimally compliant test apparatus according to the present invention, an efficient sample preparation and selection method is required. Accordingly, described herein and represented in the flowchart shown in FIG. 8 is an exemplary selection method which may be used to select an appropriate fiber for transceiver testing. For this method one may assume that the desired EMB=$EMB_D$±A %, the desired length=$L_D$±B %, desired total bandwidth BW=$EMB_D/L_D$, initial measured EMB of the fiber on spool=$EMB_{sp}$, and measured EMB at each state=$EMB_{mx}$.

In step 110, a candidate spool of MMF fiber is selected. This may be done based on any number of preliminary criteria such as preliminary EMB tests, a DMD slope angle (particularly a positive slope indicating an R-MMF characteristic), and others. In an embodiment, the DMD slope requirements specify that the inner DMD RMS slope is greater than 200 ps/km and the outer DMD is greater than 300 ps/km. Once a spool is selected, in step 112 the $EMB_{sp}$ of the spool is compared against $EMB_D$ (1+A+B) or against $EMB_D$ (1−A−B−X), with X being a tolerance variable. In an embodiment, X=0.03. In another embodiment, X=0.035. In yet another embodiment, X=0 (note that in this case $EMB_D$ (1−A−B−X) effectively becomes $EMB_D$ (1−A−B)). If $EMB_{sp}$ is greater than or equal to $EMB_D$ (1+A+B), or if $EMB_{sp}$ is less than or equal to $EMB_D$ (1−A−B−X), then the selected fiber spool is rejected in step 114 as a candidate for the test fiber. Otherwise, a sample is cut to a particular length $L_1$ in step 116 where $L_1=L_D$ (1+B). Next, in step 118 the EMB of the cut sample is measured as $EMB_{m1}$. Thereafter, at step 120 the $EMB_{m1}$ is evaluated in the following equation:

$$BW(1-A) \leq \frac{EMB_{ml}}{L_l} \leq BW(1+A)$$

If this relationship holds true, in step 122 the test sample is deemed to be an acceptable test fiber which provides a true near worst-case scenario for a given set of operating parameters, and may be used as part of a testing solution to ensure proper operation of transceivers. If, however, the relationship does not hold true, then evaluate $EMB_{m1}$ against additional conditions provided in step 124. If the conditions in step 124 do not hold true, then the fiber is rejected in step 126. On the other hand, if the conditions in step 124 hold true, the sample is cut further down to $L_2$ where $L_2$=max(($EMB_{m1}$/BW),$L_D$(1−B)) in step 128. Thereafter, the EMB of the newly cut fiber is measured as $EMB_{m2}$ in step 130 and that value is evaluated against another relationship in step 132. If the relationship of step 132 is not satisfied, the fiber is rejected. Otherwise, the test sample is deemed to be an acceptable test fiber which provides a true near worst-case scenario for a given set of operating parameters, and may be used as part of a testing solution to ensure proper operation of transceivers.

Figure 9:
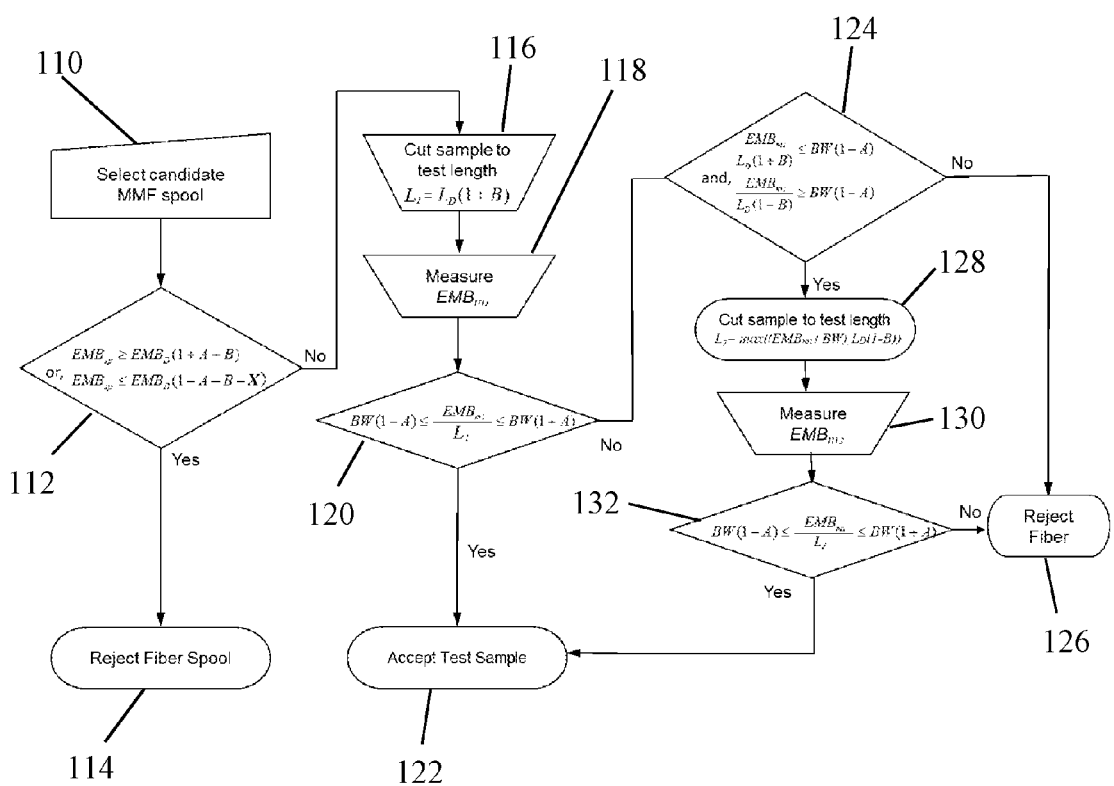
FIG. 9 illustrates a flow chart representing a fiber selection method according to an embodiment of the present invention.

The following scenario is provided as an example of the process outlined in FIG. 9 where the following characteristics are available at the beginning of the selection process:
Desired fiber length, $L_D$=300 m;
Desired EMB, $EMB_D$=2000 MHz·km;
Total desired bandwidth, BW=$EMB_D$/$L_D$=6667 MHz;
Specified A=5% (100 MHz·km);
Specified B=3.5% (10.5 m);
Initial length=8000 m.

Figure 10:
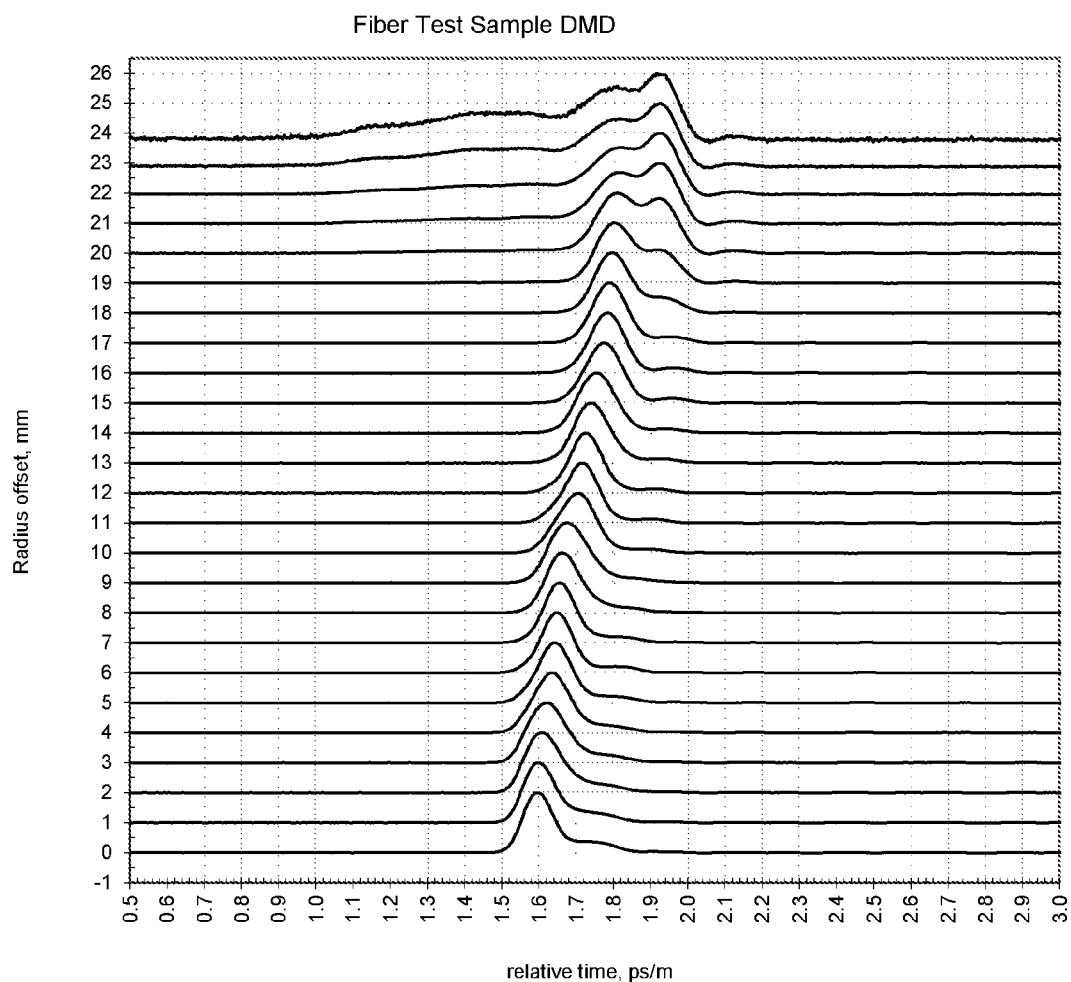
FIG. 10 illustrates an exemplary DMD plot of an optical fiber selected as a candidate for the fiber selection method.

In step 110 an MMF is selected based on its EMB and tilt orientation. The measured DMD plot of the exemplary test fiber is illustrated in FIG. 10 where the DMD radial pulse waveforms are R-shifted since the RMS slope of the centroids of each radial pulse is positive. This implies that the higher-order fiber modes at larger radial offsets propagate slower than lower-order modes at small radial offsets. In this case, the inner DMD RMS slope is greater than 200 ps/km and the outer DMD is greater than 300 ps/km.

Measuring the EMB of the spool gives a value of $EMB_{sp}$=1907 MHz km. Using this value in step 112 results in $EMB_{sp}$<($EMB_D$(1+A+B)=2190 MHz·km). Since neither condition in step 112 is met, the process continues to step 116 where a sample is cut to length $L_1$ such that $L_1$=$L_D$(1+B)=310.5 m. Next, the EMB of the cut sample is measured resulting in $EMB_{m1}$=1866 MHz·km. The newly obtained EMB value is used in evaluating the relationship in step 120. The resultant bandwidth, $EMB_{m1}$/$L_1$=6010 MHz·km, is below the maximum tolerable BW, BW(1+A)=7000 MHz·km, and is also below the minimum tolerable BW, BW(1−A)=6334 MHz·km. Therefore, the sample cannot be accepted at this stage and the evaluation process continues.

As part of the continued evaluation, in step 124 $EMB_{m1}$ is evaluated against another relationship. Since conditions ($EMB_{m1}$/[(1+B)L]=6010)≤(BW(1−A)=6334 MHz·km) and ($EMB_{m1}$/[(1−B)L]=6446)≥(BW(1−A)=6334 MHz·km) are both satisfied, the sample can be cut to a shorter length $L_2$ where $L_2$=max(($EMB_{m1}$/BW), $L_D$(1−B))=290 m. Thereafter, the EMB of the newly cut sample is measured as $EMB_{m2}$=1855 MHz·km. Lastly, the newly measured EMB value is evaluated in step 132 where both relationships ($EMB_{m2}$/$L_2$=6408)≤(BW(1+A)=7000 MHz·km) and ($EMB_{m2}$/$L_2$=6408)≥(BW(1−A)=6334 MHz·km) are satisfied. As a result, the selection process is complete with the test sample being deemed to be an acceptable test fiber which provides a true near worst-case scenario for a given set of operating parameters, and which may be used as part of a testing solution to ensure proper operation of transceivers.

Figure 11:
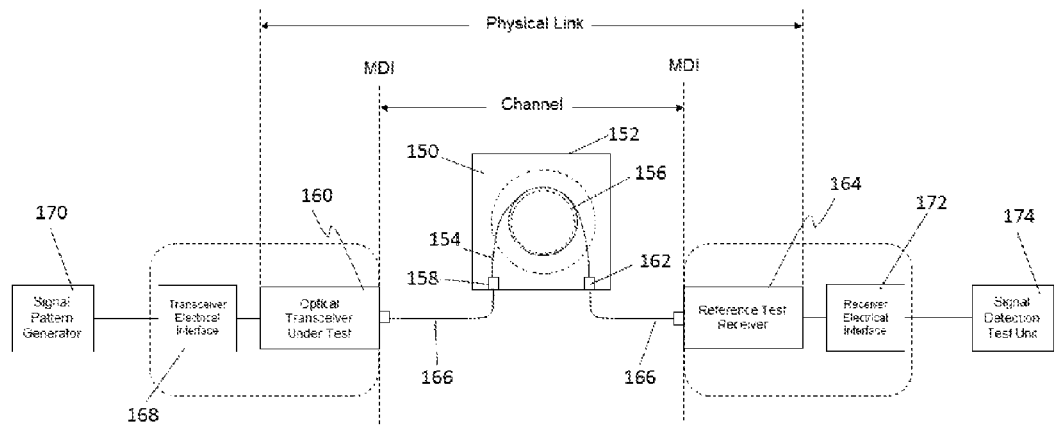
FIGS. 11 and 12 illustrate systems which employ a test apparatus in accordance with embodiments of the present invention.
Figure 12:
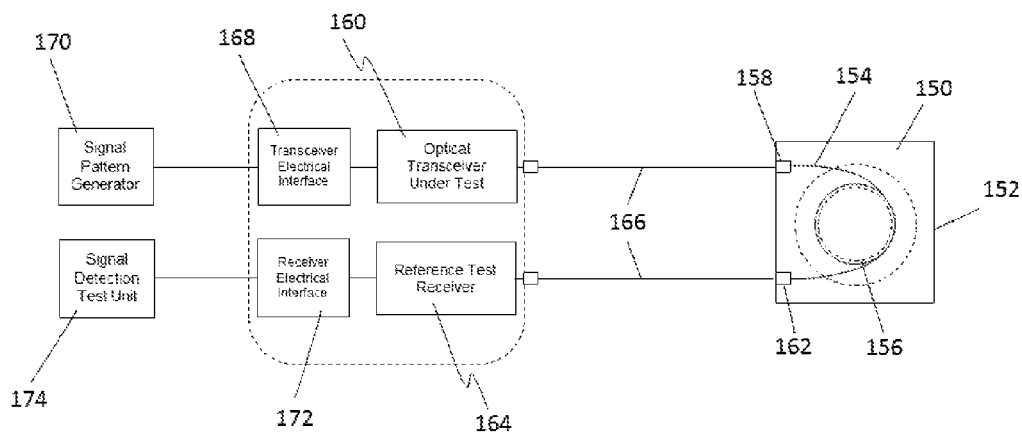

Once a test fiber is obtained, it may be used as a part of a test system and implemented in testing of various transceivers. As shown in FIGS. 11 and 12, the test system includes a test apparatus 150 which includes an enclosure 152, a test fiber 154 positioned at least partially inside the enclosure 152 and spooled around a spool 156, a fiber optic connector 158 that connects the test fiber 154 with a transceiver 160 that is to be tested, and another connector 162 that connects the opposite end of the test fiber 154 to a reference test transceiver 164. Optical patch cords 166 are used to connect the transceiver under test 160 and reference test transceiver 164 to test apparatus 150. To perform the tests, transceiver under test 160 includes a transceiver electrical interface 168 which connects to a signal pattern generator 170 for driving said transceiver 160. Likewise, to evaluate the signal generated by the transceiver under test 160, reference test transceiver 164 includes a transceiver electrical interface 172 which connects to a signal detection test unit 174.

Since the test fiber is tuned to provide a near worst-case scenario channel link, the transceiver being tested will only pass if it can maintain proper operation with such a poor channel, ensuring that the same will hold true when installed at its final destination. Conversely, if the transceiver is unable to properly transmit/receive signals along the minimally compliant channel link, then it will not pass certification.

Note, that references to minimally compliant, worst-case scenario, near-worst case scenario, and other seemingly absolute notions should be understood by those of ordinary skill as not being absolute, but instead as having a cushion. An example of this is a test fiber according to an embodiment of the present invention having an EMB that is equal to the minimum modal bandwidth requirements specified by a certain standard +/−10%. In addition, those of ordinary skill in the art will recognize that while at least some of the present disclosure makes reference to "transceivers," depending on the functionality (e.g., generating a test signal; evaluating a test signal; etc.) only the transmitter or only the receiver of said transceiver may be implicated.

While the above-described embodiments discuss a selection of certain fibers from a pre-existing fiber spool, other embodiments of the present invention can be directed towards manufacturing an optical fiber with a certain set of parameters. Normally optical fibers are manufactured with a refractive index profile that is targeted to produce a DMD having either a near-zero or a negative slope. The attempt to produce a fiber with a DMD having a near-zero slope stems from the long-time assumption that such a fiber will help equalize the arrival of an optical signal at a fiber's end. However, with the discovery of modal chromatic dispersion interaction and its effect on fiber performance as described above, the design of fibers has shifted in part to fibers which produce a left shifted DMD plot. On the contrary, embodiments of the present invention are directed towards manufacturing, what would normally be viewed as, a sub-par fiber which produces rather poor results in regular operation. In this case, the manufacturing process involves doping the core of the fiber with appropriate dopant(s) such that the resulting refractive index profile produces a DMD plot with a positive slope (i.e., a R-MMF condition) and the resulting fiber has a tightly controlled EMB window (e.g., 2000 MHz·km±10%). Additionally, the refractive index profile can be targeted such that the resulting DMD profile has a strong shift to the right while maintaining the previously outlined characteristics. This strong shift to the right will exacerbate modal chromatic dispersion interaction, providing a true example of a worst-case channel link. In an embodiment, the refractive index profile can be targeted such that the resulting DMD profile has an outer mask greater than 150 ps/km.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. Moreover, while certain methods with a certain order of steps may be described and claimed herein, those of ordinary skill will recognize that the indicated order may not be essential to the execution of the invention. Accordingly, where feasible, steps practiced out of the claimed order should be considered to fall within the scope of the claim where they appear. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. An apparatus for testing an optical transmitter, the optical transmitter designed to be used with art optical fiber meeting a minimum modal bandwidth requirement specified by a defined standard, the apparatus comprising:
   an enclosure;
   a test optical fiber positioned at least partially within the enclosure; and
   a first connector installed on a first end of the test optical fiber and a second connector installed on a second end of the test optical fiber, one of the first connector or the second connector configured to be connected to the optical transmitter,
   wherein, when coupled with the optical transmitter, the test optical fiber exacerbates modal chromatic dispersion interaction and has an effective modal bandwidth (EMB) that is equal to the minimum modal bandwidth +/− 10%, wherein the test optical fiber produces a right-shifted differential mode delay (DMD) plot, and further wherein a DMD plot is measured by launching a plurality of spectrally narrow and temporally short pulses of light radiation into one end of the test optical fiber at various radial distances r from the center of the core, and recording a temporal response for each of the spectrally narrow and temporally short pulses of light radiation at the respective radial distances r from the center of the core at a second end of the test optical fiber, and
   wherein the right-shifted DMD plot is characterized by a positive slope of a linear fit calculated between a first radial offset $r_{init}$ and a second radial offset $r_{end}$, the second radial offset $r_{end}$ being greater than the first radial offset $r_{init}$.

2. The apparatus of claim 1, wherein the linear fit is calculated by computing a centroid T(r) for at least each of the spectrally narrow and temporally short pulses of light radiation between the first radial offset $r_{init}$ and the second radial offset $r_{end}$, and using each respective the centroid T(r) to compute the linear fit between the first radial offset $r_{init}$ and the second radial offset $r_{end}$ via least square estimation.

3. The apparatus of claim 2, wherein the first radial offset $r_{init}$ is one of 1 μm, 4 μm, or 5 μm, and wherein the second radial offset $r_{end}$ is one of 19 μm, 20 μm, or 23 μm.

4. The apparatus of claim 1, wherein the minimum modal bandwidth is one of 200 MHz·km or 4700 MHz·km.

5. The apparatus of claim 1, wherein a length of the test optical fiber is one of approximately 300 meters or 450 meters.

6. A method for testing an optical transceiver designed to be used with an optical fiber meeting a minimum modal bandwidth requirement specified by a defined standard, the method comprising the steps of:
   connecting a first end of a test optical fiber to the optical transceiver, the test optical fiber being configured to exacerbate modal chromatic dispersion interaction and having an effective modal bandwidth (EMB) that is equal to the minimum modal bandwidth +/−10%;
   connecting a second end of the test optical fiber to a reference test receiver;
   transmitting an optical signal from the optical transmitter to the reference test receiver via the test optical fiber; and
   evaluating the received optical signal, wherein the test optical fiber is configured to exacerbate modal chromatic dispersion interaction by having a right-shifted differential mode delay (DMD) plot, and further wherein the DMD plot is measured by launching a plurality of spectrally narrow and temporally short pulses of light radiation into one end of the test optical fiber at various radial distances r from the center of the core, and recording a temporal response for each of the spectrally narrow and temporally short pulses of light radiation at the respective radial distances r from the center of the core at a second end of the test optical fiber, and
   wherein the right-shifted DMD plot is characterized by a positive slope of a linear fit calculated between a first radial offset $r_{init}$ and a second radial offset $r_{end}$, the second radial offset $r_{end}$ being greater than the first radial offset $r_{init}$.

7. The method of claim 6, wherein the linear fit is calculated by computing a centroid T(r) for at least each of the spectrally narrow and temporally short pulses of light radiation between the first radial offset $r_{init}$ and the second radial offset $r_{end}$, and using each respective the centroid T(r) to compute the linear fit between the first radial offset $r_{init}$ and the second radial offset $r_{end}$ via least square estimation.

8. The method of claim 7, wherein the first radial offset $r_{init}$ is one of 1 μm, 4 μm, or 5 μm, and wherein the second radial offset $r_{end}$ is one of 19 μm, 20 μm, or 23 μm.

9. The method of claim 6, wherein the test optical fiber is 300 meters.

10. The method of claim 6, wherein a refractive index profile of the test optical fiber is comprised of refractive indices n(r) defined by a function of a radial distance r from a center of a core of the test optical fiber:

$$n(r) = n_1 * \sqrt{1 - 2\left(\frac{r}{R}\right)^\alpha \Delta_0}, \text{ for } r < R,$$

where:
  $n_1$ is a refractive index at the center of the core;
  $n_2$ is a refractive index of the cladding;
  R is a radius of the core having the ideal refractive index profile;
  a is a parameter defining a shape of the ideal refractive index profile; and $$\Delta_0 = \frac{n_1^2 - n_2^2}{2n_1^2}.$$

* * * * *